Patented Sept. 3, 1935

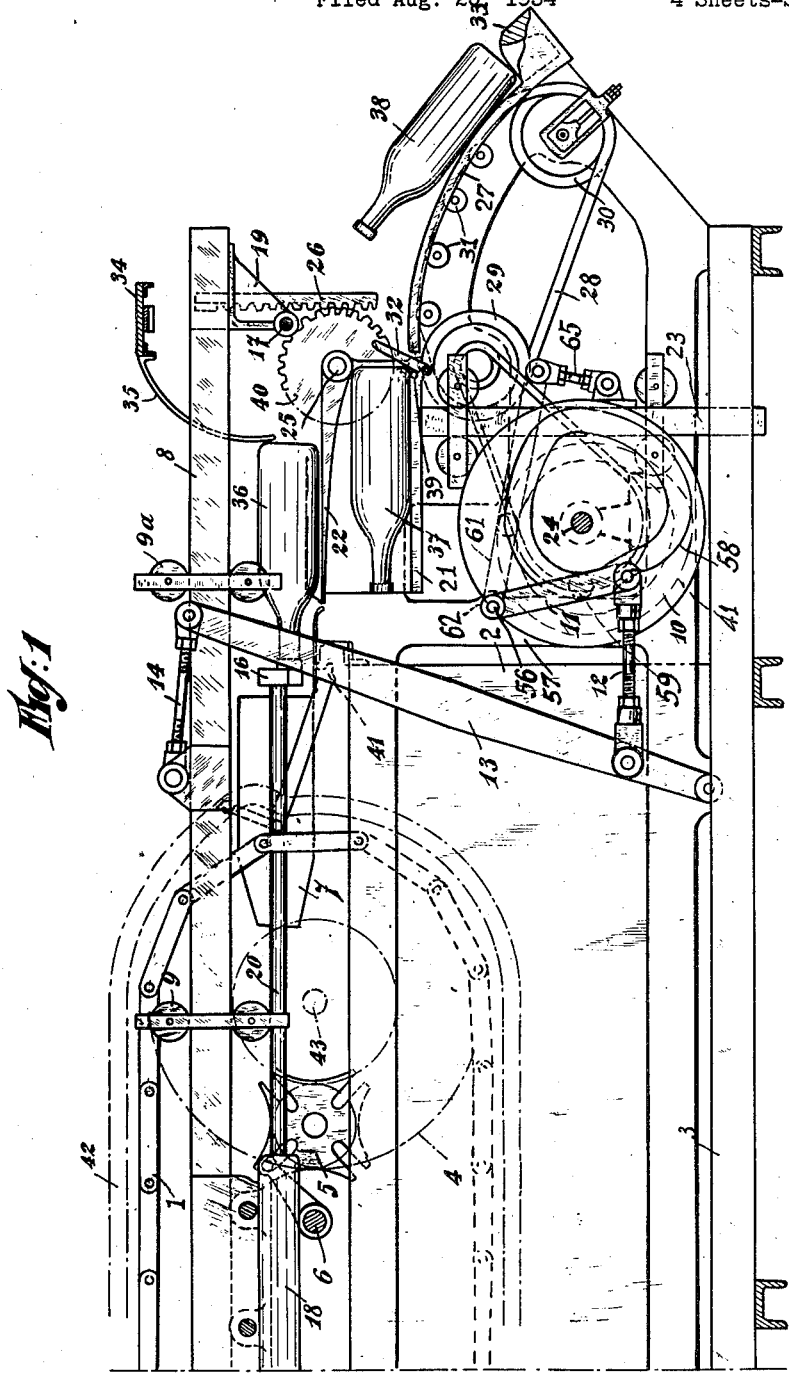

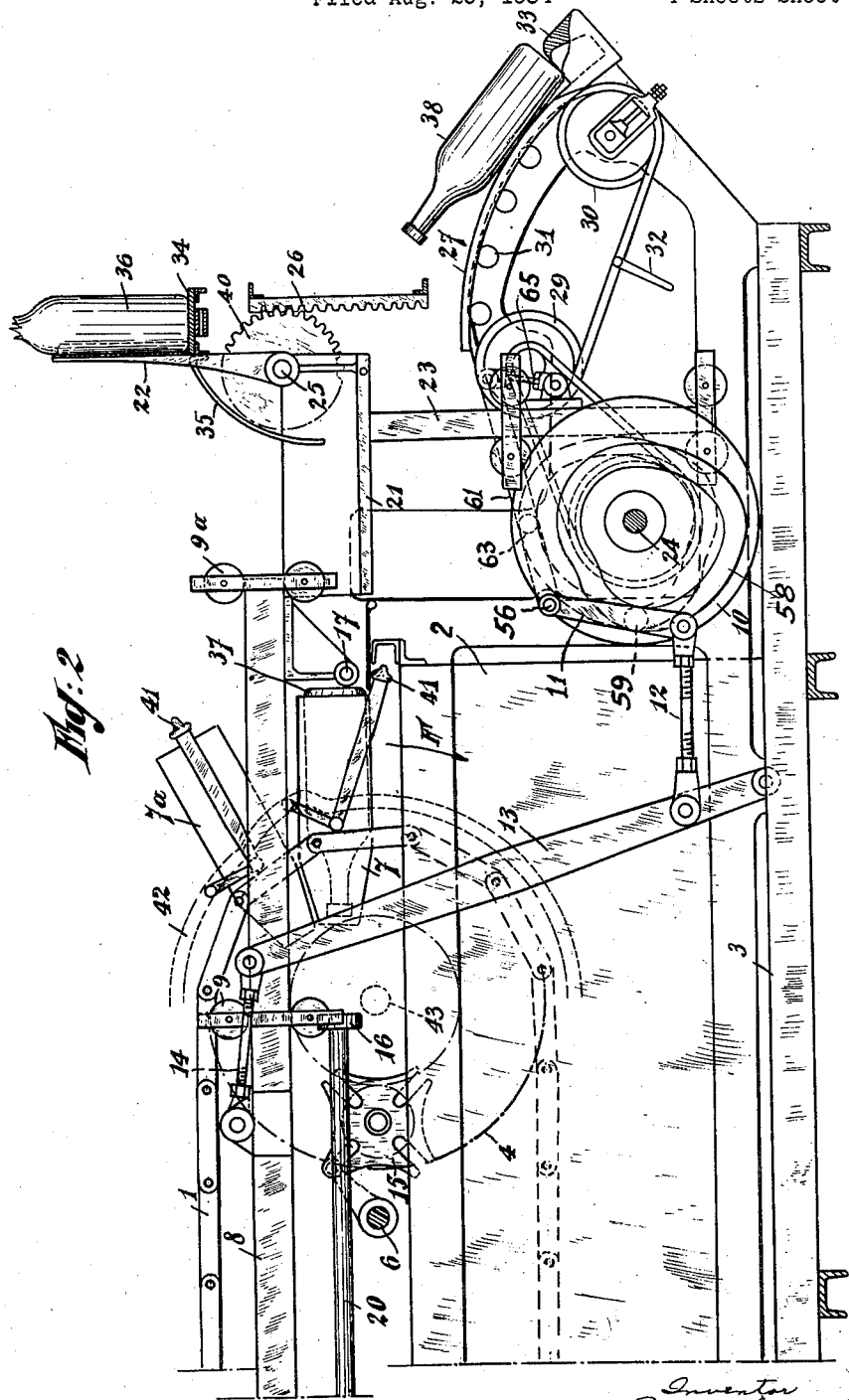

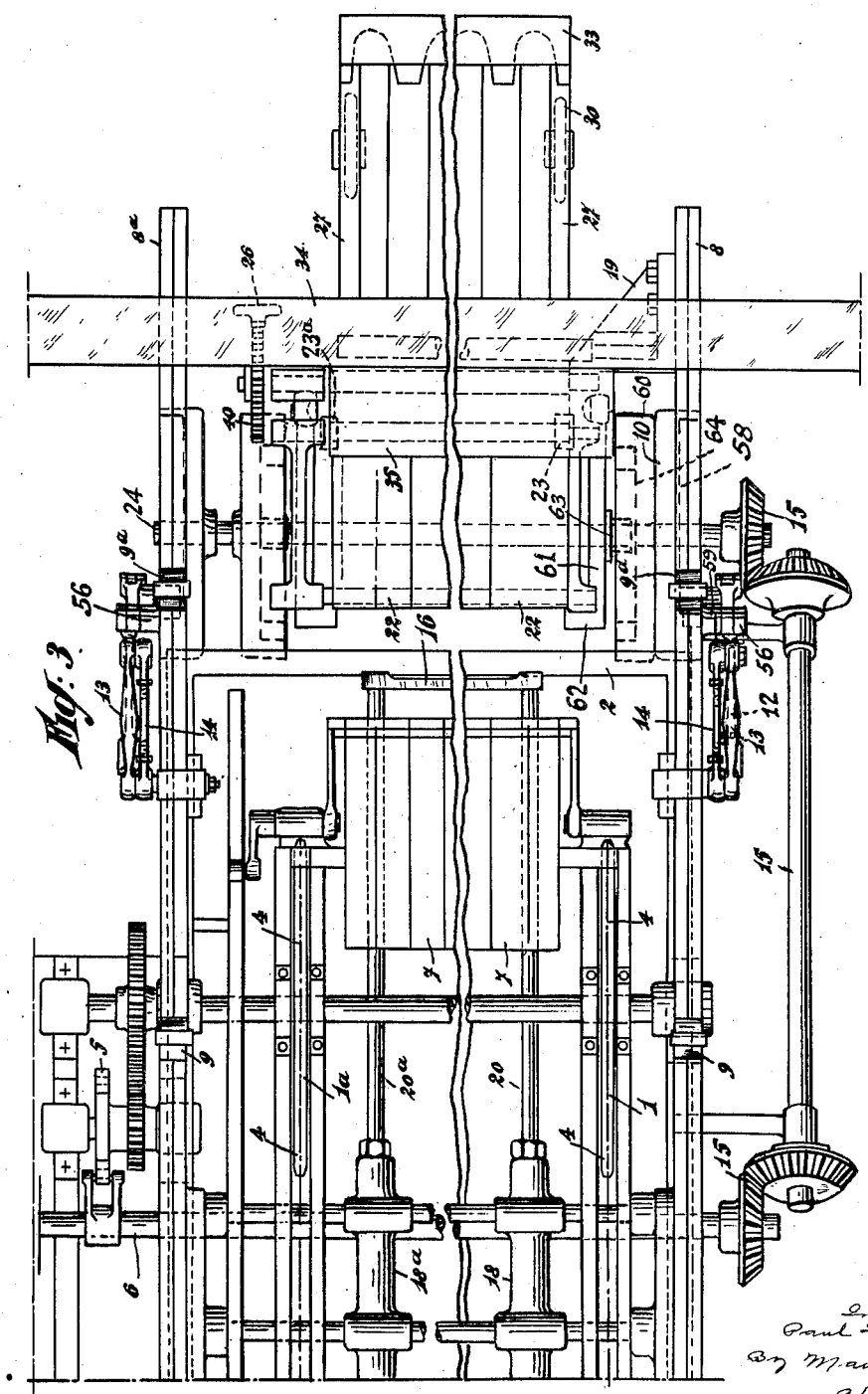

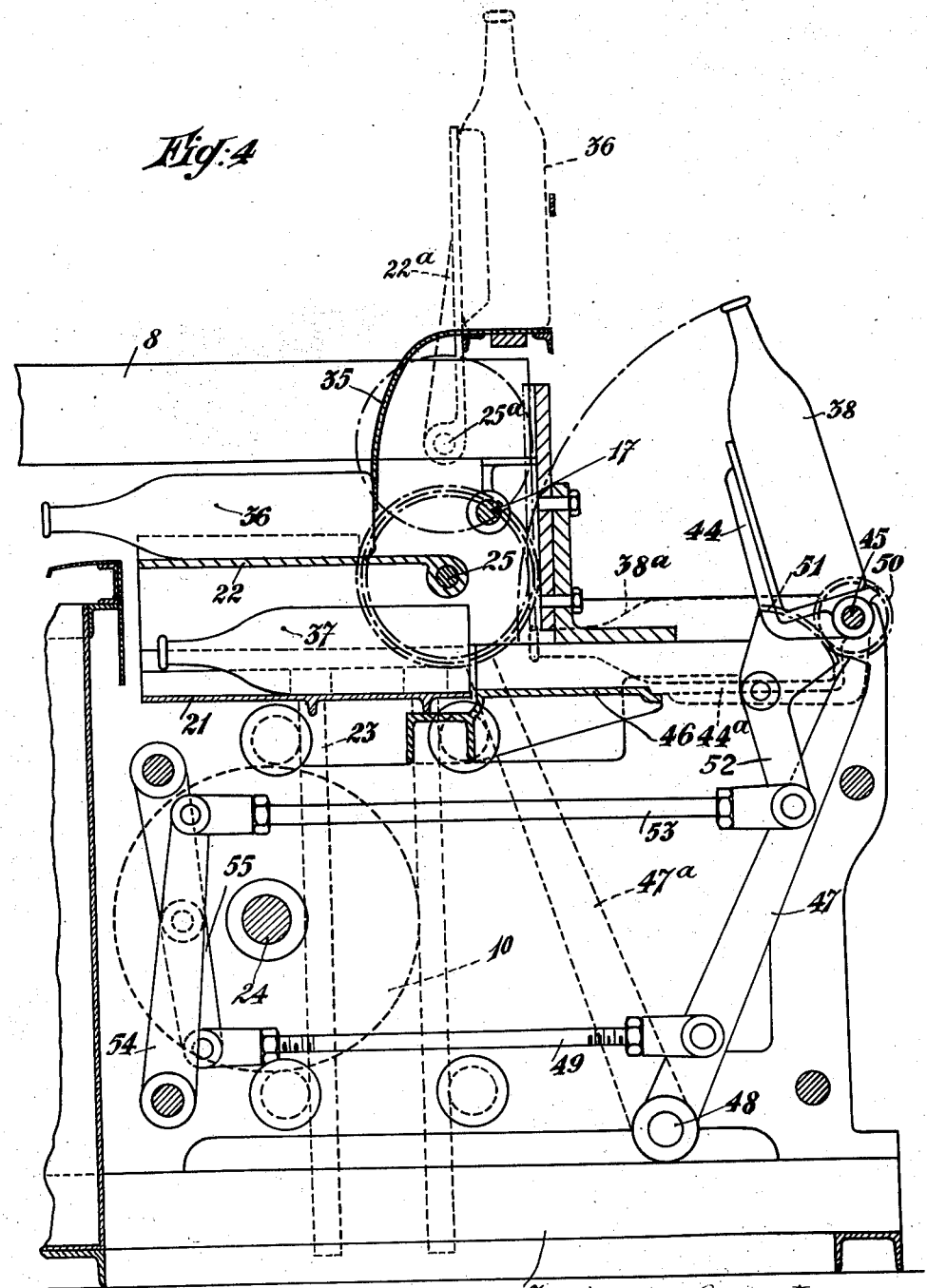

2,013,032

UNITED STATES PATENT OFFICE 2,013,032

DEVICE FOR FEEDING OR WITHDRAWING BOTTLES FOR BOTTLE RINSING MACHINES

Paul Louis Chelle, Saint-Mande, France

Application August 25, 1934, Serial No. 741,497
In France September 26, 1933

10 Claims. (Cl. 198—27)

The object of the present invention is to provide a device for automatically feeding bottles to a bottle rinsing machine and removing them therefrom. The device according to the present invention is applicable to rinsing machines of any kind whatever in which the bottles move, in an intermittent manner, in a vertical plane, through a closed circuit, that is to say are fed to the machine and withdrawn therefrom at the same point of said machine.

According to the present invention, the mechanical handling of the bottles is performed through the combinations of the movements of two carriages, to wit: a push-carriage which is given a reciprocating translatory horizontal movement, and an elevating carriage moving vertically with a reciprocating motion.

These various movements are combined in such manner as to avoid any lateral displacement of the bottles, which thus remain constantly in the same vertical plane, from the time they are placed on the feed table to the time they are delivered onto the withdrawing conveyor.

Clean bottles are removed and immediately replaced, in the same chamber, by bottles to be rinsed which are automatically caught on a feed table disposed at one end of the rinsing machine, the removal and the insertion of bottles into their respective chambers taking place along a horizontal axis.

This arrangement has the following advantages: it ensures a very smooth working of the machine, with a reduction of the noise produced by said machine, and eliminates any danger of breakage because the bottles, which are moved when placed in a horizontal position, do not strike each other, cannot topple, and slide much more easily; on the other hand, the space occupied by the machine is reduced to a minimum.

The bottles to be rinsed can be fed to the machine by means of a chain provided with gripping elements, which catch said bottles from a table on which they have been placed manually, according to the needs, by one or several operatives. With this arrangement, I obtain a smooth working of the feed device, since this working is independent of the regularity with which the operatives place the bottles to be rinsed on the feed table. Any risk of breakage of the bottles is thus avoided.

According to another embodiment of the present invention, the chain provided with gripping members is replaced by a comb-like member pivotally mounted on the frame so as to be able to catch the bottles from a pivoting feed table.

Preferred embodiments of the present invention will be hereinafter described, with reference to the accompanying drawings, given merely by way of example, and in which:

Fig. 1 is an elevational view, partly in section, of one end of the rinsing machine, with the device for feeding and withdrawing bottles according to the present invention, the whole being shown at the time when a rinsed bottle has just been ejected from its chamber;

Fig. 2 is a view analogous to Fig. 1 showing the position of the parts at the time when a bottle to be rinsed has just been inserted into the same chamber;

Fig. 3 is a plan view corresponding to Fig. 1;

Fig. 4 is an elevational view of another embodiment of the feed device of the elevating carriage, the latter being shown in the upper position.

In the drawings, I have diagrammatically shown the feed end of a rinsing machine made and adapted to work as described in my French Patent No. 751,554 of Feb. 25, 1933, with however the difference that the movable bottle carrier, instead of being simple or twofold, can include any number of chambers for the bottles moving in a row, owing to the substitution of the mechanical feed device according to the present invention for the manual feed that was utilized in the machine described in this prior patent. On the other hand, I have replaced the bottle carrier of the basket type by a bottle carrier provided with chambers of a known type driven through two chains $1$, $1^a$.

The tank 2 of the rinsing machine is carried by a frame which also supports the mechanism for feeding and withdrawing bottles according to the present invention. In Figs. 1 and 2 I have shown in dotted lines chain 1 with its sprocket wheels 4 actuated in an intermittent manner, through a Maltese cross 5, by the driving shaft 6 of the machine.

The axes of chambers 7, $7^a$ are at right angles to the spindles of the corresponding links of the chain, but they are slightly offset with respect to their middle part for a reason that will be hereinafter explained.

The horizontal carriage of the device according to the present invention consists of two horizontal bars 8, $8^a$ each of which is adapted to slide between two pairs of rollers 9, $9^a$, or, eventually, in a dovetailed guideway. The reciprocating translatory motion of the carriage is imparted thereto by a face cam 10, through a system of articulated links 11, 12, 13, 14, said link 11 being swingably mounted on a fixed pivot 56 supported by the frame 57 of the machine, and coacting with the groove 58 of cam 10 by means of a roll 59. Cam 10 is given a continuous rotary motion from the driving shaft 6 of the rinsing machine by means of a bevel gear transmission 15 (Fig. 3).

Carriage 8, 8ᵃ is provided with two push-pieces, a discharge push-piece 16 and a feed push-piece 17, located in the same horizontal plane. Each of these push-pieces consists of a horizontal bar rigidly connected to the carriage through suitable supports 18, 18ᵃ and 19. Supports 18, 18ᵃ carry the discharge push piece 16 through the medium of two overhung horizontal rods 20 and 20ᵃ.

The elevating carriage consists of two plates 21 and 22 placed one above the other and supported by two vertical rods 23 and 23ᵃ. These rods are guided in the same manner as horizontal rods 8, 8ᵃ and their vertical reciprocating translatory movement is produced in an analogous manner, by means of a face-cam 60, which is keyed on the same shaft 24 as cam 10. On each side of the machine, a link 61 is mounted on a fixed pivot 62 supported by the frame of the machine and is actuated by the cam 60 by means of a roll 63 coacting with the groove 64 of said cam 60. Its reciprocating movement is transmitted to rod 23 by means of an articulated link 65.

The lower plate 21 is fixed with respect to the elevating carriage, while the upper plate 22 is adapted to rotate about a spindle 25 of the carriage. Plate 22 is operatively connected with a toothed wheel 40 mounted on this spindle. This wheel 40 cooperates with a rack 26 which is stationary with respect to the frame, so that, when the carriage moves vertically, plate 22 pivots through an angle of 90° about spindle 25, its horizontal position corresponding to the lower position of the elevating carriage and its vertical position corresponding to the upper position of this carriage.

Both plates 21 and 22 of the elevating carriage are provided with grooves serving to prevent the bottles from moving laterally.

The feed table comprises a stationary grid 27 adapted to support the bottles. This grid is given the shape of a portion of a cylindrical surface which is tangentially joined, at its upper end, with the horizontal plane of the lower plate of the elevating carriage when the latter is in its lower position.

Under this table 27, there is disposed a conveyor chain 28 which passes around two wheels 29 and 30 and conforms with the shape of grid 27 owing to the provision of guiding rollers 31. This chain carries a movable comb-like member 32 the teeth of which extend through the intervals of the bars of grid 27. Said member 32 is pivotally mounted on a pin carried by chain 28, and a spiral spring, not shown in the drawings, urges permanently said member 32 to its operative position perpendicular to chain 28. Wheel 29 is driven from cam-shaft 24.

Table 27 is provided with a stationary edge 33 intended to maintain the bottles in position and adapted to leave a free passage for comb-like member 32. The bottles are manually placed on this table by rows of $n$ bottles, $n$ being the number of chambers 7 provided on each link of chain 1.

A blade conveyor 34, moving transversely with respect to the rinsing machine and disposed above carriage 8, 8ᵃ, serves to convey away the bottles that have been rinsed, for instance to the next machine. A curved grid 35 guides the bottles while they are moving from their horizontal position, on the elevating carriage, to their vertical position on the conveyor. Plate 22 of the elevating carriage is provided with slots for the bars of grid 35 in the course of this movement.

The device above described works in the following manner:

First operation

The elevating carriage remains stationary in its lower position (Fig. 1). Carriage 8 moves from its position in Fig. 2 to its position in Fig. 1. Push piece 16 is therefore caused to move through the row of chambers 7 which is located opposite said push piece in the horizontal position and it pushes the rinsed bottles 36 onto the upper plate 22 of the elevating carriage (Fig. 1).

At the same time, the comb-like member 32, driven by chain 28, pushes the row of bottles 38 placed on feed table 27 into position 37, on the lower plate 21 of the elevating carriage (Fig. 1), after which this member 32 is moved out of the way under the action of a stop 39 fixed on plate 21. Thus member 32 can subsequently act on a new row of bottles placed in position 38.

Second operation

Horizontal carriage 8, 8ᵃ remaining stationary in the position shown in Fig. 1, the elevating carriage moves upwardly with the two rows of bottles 36 and 37 carried by it, coming into the position shown in Fig. 2. The row of bottles to be rinsed 37 thus comes opposite the horizontal chambers 7, which are still stationary, and the row of rinsed bottles 36 is brought onto conveyor 34, owing to the rotation of plate 22 about spindle 25 through an angle of 90° (Fig. 2).

Third operation

The elevating carriage remaining stationary in the position shown in Fig. 2, the horizontal carriage 8, 8ᵃ moves from the position shown in Fig. 1 into the position shown by Fig. 2. Push-piece 17 thus engages and delivers the row of bottles 37 into the respective chambers 7 of the rinsing machine, said row of chambers being still stationary.

Fourth operation

The elevating carriage, which is now empty, is brought back to its lower position. At the same time the chain of the rinsing machine moves one step in the direction of arrow F, so as to bring the next row of chambers 7ᵃ into the horizontal position previously occupied by chambers 7.

The operations above described are now repeated.

In the drawings, it has been supposed that the bottles are maintained in the chambers of the rinsing machine by straps 41 which, under the action of a cam 42 diagrammatically shown in the drawings (Fig. 2), can be moved out of the way, so as to permit the removal and the introduction of the bottles as described in the prior patent above referred to.

As the horizontal rods 20 that carry push-piece 16 pass a little above shaft 43 of sprocket wheel 4 and as the axes of chambers 7 must be located in the same horizontal plane as these rods 20, it will be readily understood that it is necessary to offset the axis of the chambers by a certain distance with respect to the middle of the corresponding links of the chain 1, otherwise the axis of chambers 7 would pass through shaft 43 and not above it.

Fig. 4 shows a modification of the device for feeding bottles to the vertically movable carriage. In this embodiment, the chain 28 provided with gripping members is replaced by a comb-like member 47 movable about an axis 48 which is journalled in bearings not shown in the drawings but rigid with the frame of the machine.

On the other hand, the stationary feed table 27 is replaced by a grid 44 movable about an axis 45. In order to receive bottles 38 which are manually placed thereon by the operatives, grid 44 is given an inclined position. When the bottles are to be transferred onto plate 21 of the elevating carriage, grid 44 is tilted into the horizontal position 44ᵃ shown in dotted lines in Fig. 4. The bottles, which are then in the position shown at 38ᵃ, are then pushed by the end of comb-like member 47 into position 37 on the plate 21 of the elevating carriage. In the course of this movement, the teeth of comb-like member 47 pass through the intervals of the bars of the movable grid 44 and of a stationary horizontal grid 46 which serves to connect grid 44 with the lower plate 21 of the elevating carriage.

The movement of feed grid 44 and that of comb-like member 47 are both produced by cam-plate 10, which controls all the other motions of the mechanism according to the present invention. Transmission links 52, 53, 54 and 59, 55 are respectively provided for this purpose.

Of course the specific arrangement above disclosed could be modified without departing from the principle of the invention.

In a general way, while I have in the above description, disclosed what I deem to be a practical and efficient embodiment of the present invention, it should be well understood that I do not wish to be limited thereto as there might be changes made in the arrangement, disposition and form of the parts without departing from the principle of the present invention as comprehended within the scope of the appended claims.

What I claim is:

1. A device of the type described for feeding and removing bottles, for use in connection with a rinsing machine having a plurality of chambers for said bottles and an endless chain conveyor for successively and intermittently bringing said chambers into a horizontal position in which bottles present therein are to be removed therefrom and replaced by other bottles successively, which device comprises in combination, a frame, a carriage vertically movable in said frame for simultaneously moving upwardly clean bottles removed from said chamber occupying said horizontal position and feeding bottles to be rinsed opposite said chambers in said position, and means, horizontally movable in said frame for successively pushing clean bottles from said chambers onto said carriage and pushing bottles to be rinsed from said carriage into said chambers.

2. A device of the type described for feeding and removing bottles, for use in connection with a rinsing machine having a plurality of chambers for said bottles and an endless chain conveyor for successively and intermittently bringing said chambers into a horizontal position in which bottles present in said chambers are to be removed therefrom and replaced by other bottles successively, which device comprises in combination, a frame, a carriage vertically movable in said frame for simultaneously moving upwardly clean bottles removed from said chambers occupying said horizontal position and feeding bottles to be rinsed opposite said chambers in said position, a second carriage movably horizontally in said frame, and push pieces carried by said second carriage for successively pushing clean bottles from said chambers onto said first mentioned carriage and pushing bottles to be rinsed from said first mentioned carriage into said chambers in said horizontal position.

3. A device of the type described for feeding and removing bottles, for use in connection with a rinsing machine having a plurality of chambers for said bottles and an endless chain conveyor for successively and intermittently bringing said chambers into a horizontal position in which bottles present in said chambers are to be removed therefrom and replaced by other bottles, successively, which device comprises in combination, a frame, a carriage vertically movable in said frame, two horizontal plates located one above the other in said carriage, the upper plate being intended to receive clean bottles removed from said chambers occupying said horizontal position and the lower plate being intended to feed bottles to be rinsed to said chambers in said position, a second carriage movable horizontally in said frame, a push piece carried by said second mentioned carriage for pushing clean bottles from said chambers in the horizontal position onto said upper plate, and a push piece carried by said mentioned carriage for pushing bottles to be rinsed from said lower plate into said chambers in said horizontal position.

4. A device according to claim 3 in which said upper plate is pivotally mounted in said first mentioned carriage so as to be capable of rotating through an angle of 90° about an axis rigid with said first mentioned carriage.

5. A device according to claim 3 in which said upper plate is pivotally mounted in said first mentioned carriage further comprising means operative by the vertical movement of said first mentioned carriage with respect to said frame for rotating said plate through an angle of 90° in the course of the vertical displacement of said first mentioned carriage in one direction.

6. A device according to claim 3 in which said upper plate is pivotally mounted in said first mentioned carriage, further comprising a rack rigid with said frame, and a toothed wheel rigid with said upper plate and meshing with said rack for rotating said upper plate through an angle of 90° in the course of the vertical displacement of said first mentioned carriage in either direction.

7. A device according to claim 3 in which said upper plate is pivotally mounted in said first mentioned carriage, further comprising a conveyer for removing the clean bottles and means operative by the vertical movement of the first mentioned carriage with respect to said frame for rotating said plate through an angle of 90° in the course of the vertical displacement of said first mentioned carriage in said frame in such manner as to transfer the bottles carried by said upper plate onto said conveyor.

8. A device of the type described for feeding and removing bottles, for use in connection with a rinsing machine having a plurality of chambers for said bottles and an endless chain conveyor for successively and intermittently bringing said chambers into a horizontal position in which bottles present in said chambers are to be removed therefrom and replaced by other bottles successively, which device comprises in combination, a frame, a carriage vertically movable in said frame, two horizontal plates located one above the other in said carriage, the upper plate being intended to receive clean bottles removed from said chambers occupying said horizontal position and the lower plate being intended to feed bottles to be rinsed to said chambers in said horizontal position, a second carriage movable horizontally in said frame, a push-piece carried by said second mentioned carriage for pushing clean bottles from said chambers in the horizontal position onto said upper plate, a push piece carried by said second mentioned carriage for pushing bottles to be rinsed from said lower plate into said chambers in said horizontal position, a feed table for bottles to be rinsed, and mechanical means for transferring bottles from said feed table to said lower plate.

9. A device according to claim 8 in which the last mentioned means include a conveyor operatively connected with said endless chain conveyor of the rinsing machine, and means carried by said second mentioned conveyor for catching the bottles and maintaining them along said second mentioned conveyor.

10. A device according to claim 8 in which said feed table is of grid-like structure and the last mentioned means include a comb-like member adapted to engage between the bars of said grid-like structure for transferring bottles from said table to the lower plate of the first mentioned carriage.

PAUL LOUIS CHELLE.